US012729601B1

(12) United States Patent
Alghazal et al.

(10) Patent No.: US 12,729,601 B1
(45) Date of Patent: Sep. 8, 2026

(54) DOWNHOLE AUTONOMOUS INFLOW CONTROL DEVICE

(71) Applicant: SAUDI ARABIAN OIL COMPANY, Dhahran (SA)

(72) Inventors: Mohammed A. Alghazal, Dhahran (SA); Bruno Alain Stenger, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 19/073,272

(22) Filed: Mar. 7, 2025

(51) Int. Cl.
*E21B 34/06* (2006.01)
*E21B 41/00* (2006.01)
*E21B 43/08* (2006.01)
*F03B 13/02* (2006.01)

(52) U.S. Cl.
CPC ........ *E21B 34/066* (2013.01); *E21B 41/0085* (2013.01); *E21B 43/08* (2013.01); *F03B 13/02* (2013.01); *F05B 2220/706* (2013.01)

(58) Field of Classification Search
CPC ...... E21B 34/063; E21B 34/066; E21B 34/06; E21B 2200/02; E21B 43/12; E21B 34/08; Y10T 137/1632
See application file for complete search history.

(56) References Cited

U.S. PATENT DOCUMENTS 2,882,213 A 4/1959 Douglas
5,639,959 A * 6/1997 Reiber .................. G01N 17/00 73/86
7,699,101 B2 4/2010 Fripp et al.
9,382,779 B2 7/2016 Dykstra et al.
(Continued)

FOREIGN PATENT DOCUMENTS

EP 2815066 B1 9/2017
WO 2012036917 A2 3/2012
WO 2020/060658 A1 3/2020

OTHER PUBLICATIONS

Mathiesen, V. , et al., "The Autonomous RCP Valve—New Technology for Inflow Control In Horizontal Wells," Paper presented at the SPE Offshore Europe Oil and Gas Conference and Exhibition, Aberdeen, UK, Sep. 2011 (10 pages.
(Continued)

*Primary Examiner* — George S Gray
(74) *Attorney, Agent, or Firm* — Osha Bergman Watanabe & Burton LLP

(57) ABSTRACT

A downhole autonomous inflow control device (D-AICD) disposed in a tubing string within a wellbore and method. The D-AICD includes a chamber in fluid communication with a reservoir to receive produced well fluids and a galvanic inflow control valve (GICV) including a housing. The GICV regulates flow of well fluids entering the tubing string via disengaged and engaged positions. The housing includes a fluid inlet hydraulically connecting a cavity inside the housing to the chamber, at least two outlets hydraulically connecting the cavity to the tubing string, and at least two copper spheres inside the housing on a seat on a steel base in a central axis inside the housing when disengaged. The GICV further includes the two copper spheres moving inside the two outlets based on a reaction between the two copper spheres, the seat, and the steel base due to saltwater exposure when engaged.

18 Claims, 9 Drawing Sheets

(56) References Cited

U.S. PATENT DOCUMENTS

| | | | | |
|---|---|---|---|---|
| 10,674,931 | B2 | 6/2020 | Suster et al. | |
| 11,299,960 | B2 | 4/2022 | Zachariah et al. | |
| 2012/0214715 | A1* | 8/2012 | Luo | C09K 8/62 507/260 |
| 2016/0251937 | A1* | 9/2016 | Fripp | E21B 34/063 166/373 |
| 2020/0208496 | A1* | 7/2020 | Veselka | E21B 43/086 |
| 2022/0090978 | A1* | 3/2022 | Goldstein | E04B 1/665 |
| 2025/0334043 | A1* | 10/2025 | McChesney | E21B 34/066 |

OTHER PUBLICATIONS

Freyer, R., et al., "An Oil Selective Inflow Control System," Paper presented at the European Petroleum Conference, Aberdeen, United Kingdom, Oct. 2002 (8 pages).
International Search Report issued in corresponding International Application No. PCT/US2026/017519; mailed May 13, 2026 (4 pages).
Written Opinion of the International Searching Authority issued in corresponding International Application No. PCT/US2026/017519; dated May 13, 2026 (6 pages).

* cited by examiner

DOWNHOLE AUTONOMOUS INFLOW CONTROL DEVICE

BACKGROUND

In the petroleum industry, operations may be performed in a well at various depths below the surface with downhole tools. For example, fluids are typically produced from a reservoir in a formation by drilling a wellbore into the formation, establishing a flow path between the reservoir and the wellbore, and conveying the fluids from the reservoir to the surface through the wellbore. Typically, a production tubing is disposed in the wellbore to carry the fluids to the surface. The produced fluids may include hydrocarbons (e.g., oil and/or gas) and water.

As the produced fluids may contain water, a ratio of hydrocarbons (e.g., oil and/or gas) to water may vary throughout the lifetime of the well. Therefore, it is advantageous to restrict or otherwise limit an influx of fluid flow into the wellbore when the water fraction is high and resume a higher or unrestricted flow when the water fraction reduces. For example, to enhance oil recovery and reduce water production, inflow control valves (ICV) may be provided in the production tubing to regulate a flow of well fluids entering the production tubing based on a ratio of hydrocarbons (e.g., oil and/or gas) to water. The ICVs prevent an influx of water entering the production tubing such that the well fluids produced to the surface contain a predetermined volume of hydrocarbons.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a downhole autonomous inflow control device (D-AICD) disposed in a tubing string within a wellbore, the D-AICD comprising: a chamber in fluid communication with a reservoir and configured to receive well fluids produced from the reservoir; a galvanic inflow control valve (GICV) comprising a housing, a disengaged position, and an engaged position, the GICV configured to regulate flow of well fluids entering the tubing string via the disengaged position and the engaged position, the housing comprising: a fluid inlet hydraulically connecting a cavity disposed inside the housing to the chamber; at least two outlets hydraulically connecting the cavity to the tubing string; in the disengaged position of the GICV, at least two copper spheres are disposed inside the housing on a seat on a steel base disposed in a central axis inside the housing; and in the engaged position of the GICV, the at least two copper spheres are configured to move inside the at least two outlets based on a reaction between the at least two copper spheres, the seat, and the steel base due to saltwater exposure, wherein the seat comprises a spot tin solder welding, and wherein a diameter of the at least two copper spheres is larger than a diameter of the at least two outlets.

In one aspect, embodiments disclosed herein relate to a method for a downhole autonomous inflow control device (D-AICD) disposed in a tubing string within a wellbore, the D-AICD comprising: a chamber in fluid communication with a reservoir; a galvanic inflow control valve (GICV) comprising a housing, a disengaged position, and an engaged position, the GICV configured to regulate a flow of well fluids entering the tubing string via the disengaged position and the engaged position, the housing comprising: a fluid inlet hydraulically connecting a cavity disposed inside the housing to the chamber; at least two outlets hydraulically connecting the cavity to the tubing string; in the disengaged position of the GICV, at least two copper spheres are disposed inside the housing on a seat on a steel base disposed in a central axis inside the housing; and in the engaged position of the GICV, the at least two copper spheres are configured to move inside the at least two outlets based on a reaction between the at least two copper spheres, the seat, and the steel base due to saltwater exposure, wherein the seat comprises a spot tin solder welding, and wherein a diameter of the at least two copper spheres is larger than a diameter of the at least two outlets, the method comprising: receiving well fluids produced from the reservoir into the chamber disposed in the D-AICD and into the cavity in the housing via the fluid inlet; regulating flow of the received well fluids entering the tubing string, via the at least two outlets in the housing, through the disengaged position and the engaged position of the GICV; and engaging the GICV into the engaged position by moving the at least two copper spheres to sit inside the at least two outlets based on a reaction between the at least two copper spheres, the seat, and the steel base due to saltwater exposure.

Other aspects and advantages of the claimed subject matter will be apparent from the following description and the appended claims.

DETAILED DESCRIPTION

Figure 1:
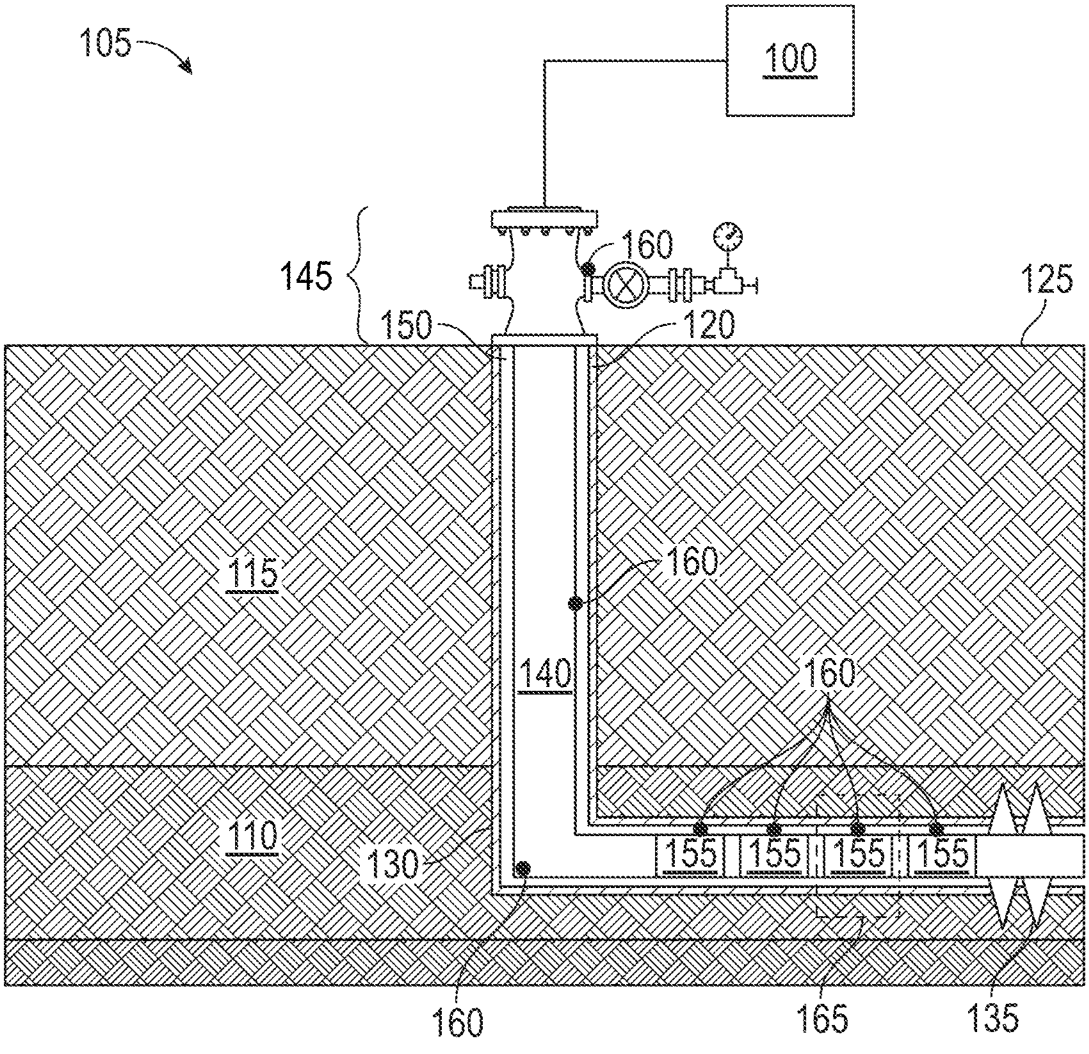
FIG. 1 shows a well system in accordance with one or more embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-12, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a horizontal beam" includes reference to one or more of such beams.

Further, embodiments disclosed herein are described with terms designating a rig site in reference to a land rig, but any terms designating rig type should not be deemed to limit the scope of the disclosure. For example, embodiments of the disclosure may be used on an offshore rig and various rig sites, such as land/drilling rig and drilling vessel. It is to be further understood that the various embodiments described herein may be used in various stages of a well, such as rig site preparation, drilling, completion, abandonment etc., and in other environments, such as work-over rigs, fracking installation, well-testing installation, and oil and gas production installation, without departing from the scope of the present disclosure. The embodiments are described merely as examples of useful applications, which are not limited to any specific details of the embodiments herein.

Petroleum economics encourage field operators to continually enhance the production potential and deliverability of subsurface hydrocarbon reservoirs. Although development of horizontal producing wells increases well potential, the complexity of controlling production of unwanted fluids, such as water, increases.

In general, embodiments of the disclosure describe a downhole autonomous inflow control device (D-AICD) in a tubing string within a wellbore and a method for the D-AICD. The D-AICD is an oil or gas well downhole completion electromechanical device designed to throttle production from pre-existing production channels, such as ports, until closure as water production increases. The D-AICD may be used in reservoir engineering, production downhole completion, and water management.

Conventional inflow control devices are density-based and viscosity-based. Conventional inflow control devices limit production of unwanted fluids based on the difference between fluid densities or viscosities. For example, the difference in fluid densities are represented by venturi effect according to the Bernoulli principle. However, while fluid density and viscosity are markedly different for liquid and gas phases, fluid density and viscosity are less different between oil and water phases. Because of oil and water phases having similar density and viscosity, conventional inflow control devices have limited effectiveness in limiting unwanted water production in oil producing wells. Specifically, the Bernoulli principle involves a significant flowing pressure loss, which restricts the applicability of conventional inflow control devices to high reservoir permeability with high reservoir pressure situations.

Advantages of the D-AICD include the integration of components to autonomously regulate downhole water production in subsurface formations, a command and control interface, and a production throttle system. The production throttle system includes a multiple sealing ball with a galvanic time-release mechanism, herein referred to as a galvanic autonomous inflow control valve (GICV). The GICV is controlled by a signal output from the command and control interface and an autonomous downhole electromechanical power pack with a turbine and failsafe rechargeable battery. The D-AICD integrated dielectric sensors to detect water arrival and water content. Although embodiments disclosed herein are described with terms referring to "autonomous" or "autonomously", any terms designating autonomy should not be deemed to limit the scope. A person of ordinary skill in the art would appreciate that the autonomous components may be manual.

Embodiments described herein may solve throttling down unwanted water production in an oil and/or gas well as a function of water content in a downhole well stream without the need to incur expensive hydraulic or electrical control lines back to surface.

FIG. 1 shows a production operation with a management system (100) at a completion well site (105) in accordance with one or more embodiments. Well fluids are produced from a reservoir (110) in a formation (115) by drilling a wellbore (120) into the formation (115), establishing a flow path between the reservoir (110) and the wellbore (120). Well fluids are conveyed from the reservoir (110) to a surface (125) through the wellbore (120).

The wellbore (120) may include a vertical section to reach the reservoir (110). A casing (130) may be installed in the wellbore (120). In some embodiments, the casing (130) may be perforated to have perforations (135) into the reservoir (110) to allow a flow of well fluids to enter the wellbore (120). A production tubing string (140) is disposed in the wellbore (120) to carry the well fluids to the surface (125). The production tubing string (140) hangs from a wellhead (145) at the surface (125) and forms an annulus (150) between the production tubing string (140) and the wellbore (120). The production tubing string (140) may extend horizontally into the reservoir (110), thereby forming a flow conduit from the reservoir (110) to the surface (125).

From the wellhead (145), the fluids are transported, via a production flow line, to a production storage, transport, or facility. In some embodiments, a Christmas tree may be disposed on top of the wellhead (145) for fluid transportation. In some embodiments, the production tubing string (140) may be an injection tubing string that injects fluid down into the reservoir (110). For example, a fluid source may be coupled to the wellhead (145) and fluids from the fluid source may be injected through the wellhead (145) down the injection tubing string and into the reservoir (110).

As well fluids are produced from the reservoir (110), the well fluids flow into the annulus (150). As the well fluids may contain water, a ratio of hydrocarbons (e.g., oil and/or gas) to water may vary throughout the lifetime of the well. To control an influx of water, one or more inflow control devices (155) may be provided in the production tubing string (140). As the well fluids flow in the annulus (150), the produced well fluids may flow from the annulus (150) and into the production tubing string (140) via the one or more inflow control device (155).

In one or more embodiments, sensors (160) are provided on the well equipment throughout the completion well site (105). For example, sensors (160) may be provided on the wellhead (145) to measure various pressures, temperatures, flow rates, and fluid properties of a fluid going out (i.e., production) or in (i.e., injection) the wellbore (120). Sensors are also provided on the production tubing string (140) to measure various pressures, temperatures, flow rates, and fluid properties of a fluid in a downhole environment both within the production tubing string (140) and in the annulus (150).

Additionally, sensors (160) provided on the one or more inflow control devices (155) may measure various pressures, temperatures, flow rates, and fluid properties of a fluid exiting the reservoir (110) and entering the production tubing string (140). For example, the sensors (160) on the one or more inflow control devices (155) may measure a volume of water in a fluid entering the production tubing string (140).

Furthermore, sensors (160) provided on the production tubing string (140) approximate the perforations (135) may measure various pressures, temperatures, flow rates, and fluid properties of a fluid at the bottom of the wellbore (120) and the reservoir (110). The sensors (160) may be pressure sensors, temperature sensors, torque sensors, rotary switches, weight sensors, position sensors, microswitches, hydrophones, accelerometers, etc.

Figure 2:
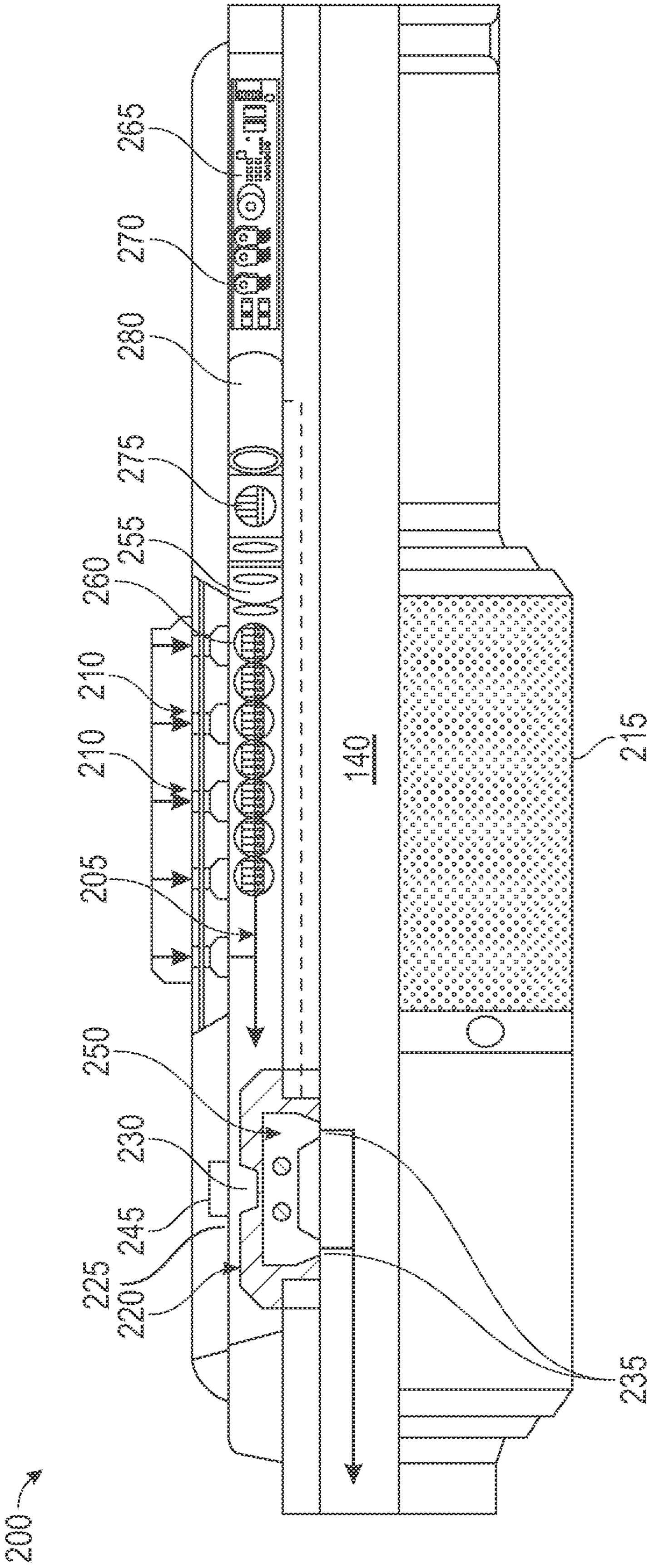
FIG. 2 shows a device in accordance with one or more embodiments.

FIG. 2 shows a cross sectional view of a downhole autonomous inflow control device (D-AICD) (200) in accordance with one or more embodiments. Specifically, FIG. 2 shows a close-up view of the dotted box (165) in FIG. 1 illustrating a cross-sectional view of produced well fluids flowing into one or more inflow control devices (155) or D-AICDs (200). The D-AICD (200) may be used in conjunction with the completion well site (105) of FIG. 1 and disposed in the tubing string (140) within the wellbore (120). The D-AICD (200) may replace the inflow control devices (155) of FIG. 1 or be used in combination with the inflow control devices (155).

The D-AICD (200) includes a chamber (205) in fluid communication with a reservoir (i.e., reservoir (110)) to receive well fluids produced from the reservoir (110). As indicated by the arrows in FIG. 2, fluid may flow through ports (210) in the D-AICD (200) to fluidly connect the chamber (205) with the reservoir (110). In some embodiments, the D-AICD (200) includes a sand screen (215). A person of ordinary skill in the art would appreciate that the sand screen (215) may be any filter capable of filtering sand from the reservoir (110). The D-AICD (200) includes a galvanic inflow control valve (GICV) (220) to regulate the fluid flow entering the tubing string (140). In some embodiments, the GICV (220) is located in the chamber (205). The GICV (220) is capable of disengaging and engaging to regulate the fluid flow depending on the position of the GICV (220).

The GICV (220) includes a housing (225) with a fluid inlet (230) and at least two outlets (235). The fluid inlet (230) hydraulically connects a cavity (250) inside the housing (225) to the chamber (205). The outlets (235) hydraulically connect the cavity to the tubing string (140). For example, when fluid flows from the reservoir (110) into the chamber (205), the fluid may flow into the GICV (220) via the fluid inlet (230) and into the tubing string (140) via the outlets (235). One or more dielectric sensors (245) may be coupled to the GICV (220) to measure water content and arrival within the chamber (205). In some embodiments, the dielectric sensor (245) is located in the D-AICD (200) housing. Operational specifications for the dielectric sensor (245) may include temperature and pressure range, input power, and output signal conditions.

In some embodiments, the D-AICD (200) includes a turbine generator (255) for generating voltage. The turbine generator (255) may include a blade spinner (260) in the chamber (205). The turbine generator (255) may be any type of voltage generator. As discussed in more detail below, the turbine generator (255) may be capable of engaging and disengaging the GICV (220). In such embodiments, a control system (265) may be in communication with the dielectric sensor (245) and turbine generator (255). The control system (265) may include any controller (270) or computer processor (e.g., computer processor (1205) discussed in FIG. 12) capable of receiving measured water content and arrival from the dielectric sensor (245). The control system (265) may create commands to adjust voltage of the turbine generator (255) using a voltage regulator (275) coupled to the turbine generator (255). In some instances, the control system (265) includes a circuit board. The turbine generator (255) may be used to power the control system (265) and/or the dielectric sensors (245).

In one or more embodiments, the D-AICD (200) includes a battery (280) coupled to the voltage regulator (275) or turbine generator (255). The battery (280) may be used for powering the control system (265), the turbine generator (255), and/or the voltage regulator (275). In some embodiments, the battery (280) may power the dielectric sensors (245). The battery (280) may be any source of power capable of powering components in the D-AICD (200) and made up of any industry known battery material, such as a sodium nickel chloride battery or a sodium sulfur battery. The battery (280) may be a fail-safe battery working at downhole temperature. Heat generated from the downhole turbine generator (255) is expected to maintain the operating temperature, such as above a required 125 degrees Celsius, for batteries (280) properly potted within an isolating ceramic housing. Sodium sulfur batteries may aid in stabilizing alternative generators acting in tandem with the voltage regulator (275).

As shown in FIG. 2, the control system (265) and two or more rotors in the turbine generator (255) may be installed in series. As those skilled in the art will readily appreciate, the control system (265) may be located along a side flow channel, which flows parallel to the housing and is connected with a flow diverter. The placement of the blade spinners (260) or rotors of the turbine generator (255) provides full clearance for wellbore access to the tubing string (140). For example, in some embodiments, a redundant sliding sleeve activated with a shifting key run in coiled tubing may be installed in the completion system.

Figure 3:
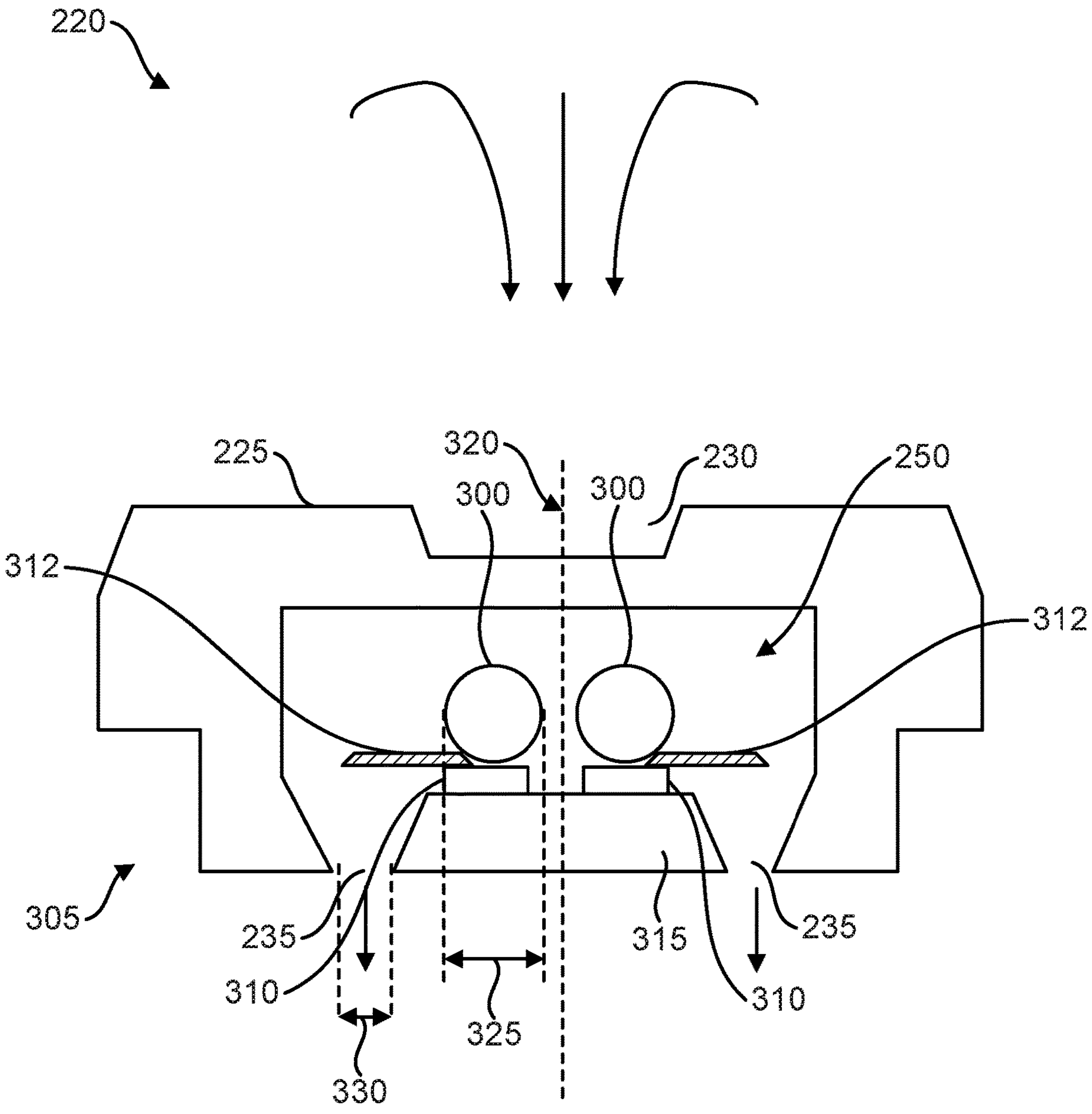
FIG. 3 shows a valve used in conjunction with FIG. 2 in accordance with one or more embodiments.

FIG. 3 shows a GICV in accordance with one or more embodiments. Specifically, FIG. 3 shows the GICV (220) and the housing (225) illustrated and discussed in FIG. 2, i.e., GICV (220). The GICV (220) includes at least two copper metallic spheres (300) in the cavity (250) of the GICV (220) used for engaging and disengaging the GICV (220). As discussed previously, the GICV (220) is capable of having an engaged position and a disengaged position. FIG. 3 specifically shows the disengaged position (305) or inactive position of the GICV (220). In some embodiments, the disengaged position (305) is considered the initial position of the GICV (220), when the GICV (220) is fully open. For example, the disengaged position (305) may allow for fluids to enter an inlet (230) of the housing (225) and exit through two outlets (235) into the tubing string (140) with minimal restriction.

In the disengaged position, the two copper spheres (300) are seated or held in position in a housing (225) of the GICV (220) on a seat (310). Each seat (310) is located on a steel base (315) disposed on a central axis (320) inside the housing (225). The seat (310) includes a spot tin solder (312) of designed thickness between the steel base (315) and the copper spheres (300). The seat (310) may be made of a silver material. As shown in the figure, fluid may flow through the outlets (235) with limited restriction because the copper spheres (300) are held on the seats (310).

Figure 4:
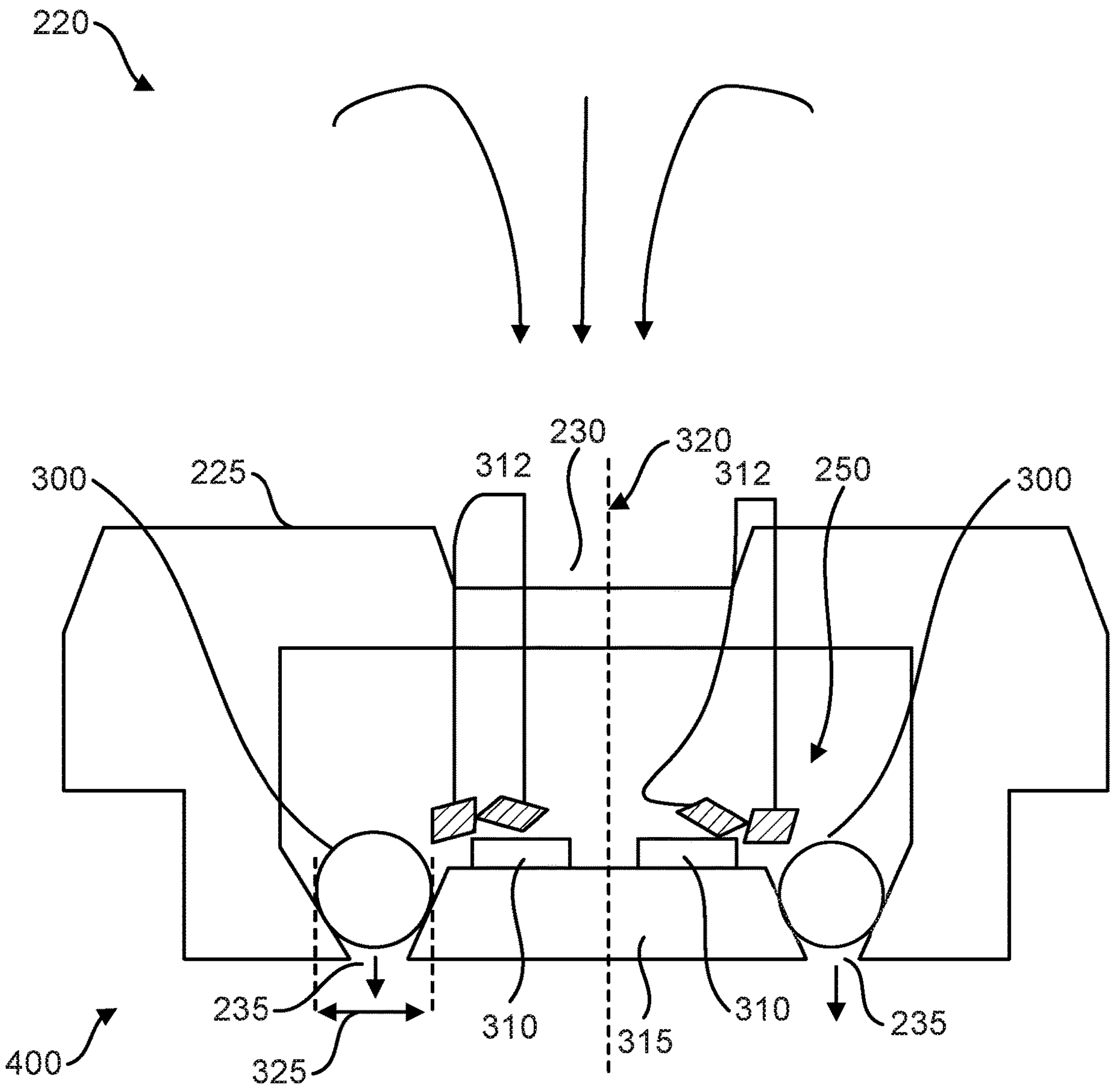
FIG. 4 shows a valve used in conjunction with FIG. 2 in accordance with one or more embodiments.

FIG. 4 shows a GICV in accordance with one or more embodiments. Specifically, FIG. 4 shows the GICV (220) of FIGS. 2 and 3 in an engaged position (400) or an active position. In some embodiments, the engaged position (400) is considered the position in which the GICV (220) is partially or completely closed. For example, the engaged position (400) may allow for limited or restricted fluid flow through the outlets (235) by using the copper spheres (300) positioned in the outlets (235). In such embodiments, the copper spheres (300) have a diameter (325) larger than the diameter (330) of the outlets (235), as shown in FIG. 3, in order for the copper spheres (300) to sit inside the outlets (235) preventing fall through of the copper spheres (300).

In some embodiments, when exposed to salt water, the copper spheres (300) act as a cathode and the seat (310) made of tin or silver, and the spot tin solder (312), with the steel base (315) acts as an anode. A person of ordinary skill in the art would appreciate that with well-established galvanic corrosion and tin and steel being corroded, silver acts as a mediating agent depending on content percentage while copper remains unaffected. When engaging the GICV (220) in a passive operating mode, the salt water exposure causes the seat to corrode releasing the copper spheres (300) automatically into the outlets (235).

As illustrated in FIG. 4, the copper spheres (300) move inside the two outlets (235) based on the chemical reaction between the copper spheres (300), the seat (310), and the steel base (315), due to saltwater exposure. The engaged position (400) may then block fluid flow from the outlets (235) when the copper spheres (300) are in place. The number of copper spheres (300), size of diameters (325, 330), and number of outlets (235) may vary dependent of the required application. For example, in the absence of a control system (265) discussed previously, the GICV (220) may operate passively because the copper spheres (300) release after sufficient exposure to salt water and corrosion of the spot tin solder (312), the tin/silver seat (310) and/or steel base (315).

In other embodiments, when produced water salinity is low, the passive operating mode may require activation of the GICV (220) using a variable direct electrical current (DC) in an active operating mode. Turning back to FIG. 2, in such instances, the active operating model of the GICV (220) includes regulating the electrical current voltage of the D-AICD (200) as a function of the produced fluid water content and arrival as measured by the dielectric sensor (245). In such instances, voltage generation or electrical current generation is capable of activating the GICV (220) into the engaged and disengaged positions (305, 400) by moving the copper spheres (300), as described previously. For example, the control system (265) receives the produced water content and arrival from the dielectric sensor (245) to automatically adjust the voltage of the turbine generator (255). The turbine generator (255) then applies the voltage towards the GICV (220) to actuate the cathodes and anodes to achieve the engaged position and the disengaged position (305) using the copper spheres (300). Dosage of the tin solder (312) or silver composition of the seat (310) and use of impressed current cathodic protection provided through the active mode may provide progressive release of the copper spheres (300) for an expected production of water salinity and control the fluid flow.

In some embodiments, once the GICV (220) has been activated into the engaged position (305), the GICV (220) is disengaged by reversing flow to pushing the copper spheres (300) out of the outlets (235). Alternatively, the GICV (220) may be disengaged by ceasing production depending on positioning of the GICV (220) by releasing the copper spheres (300) by gravity. During continuous production operations, the GICV (220) may not disengage once in the engaged position (305).

Figure 5:
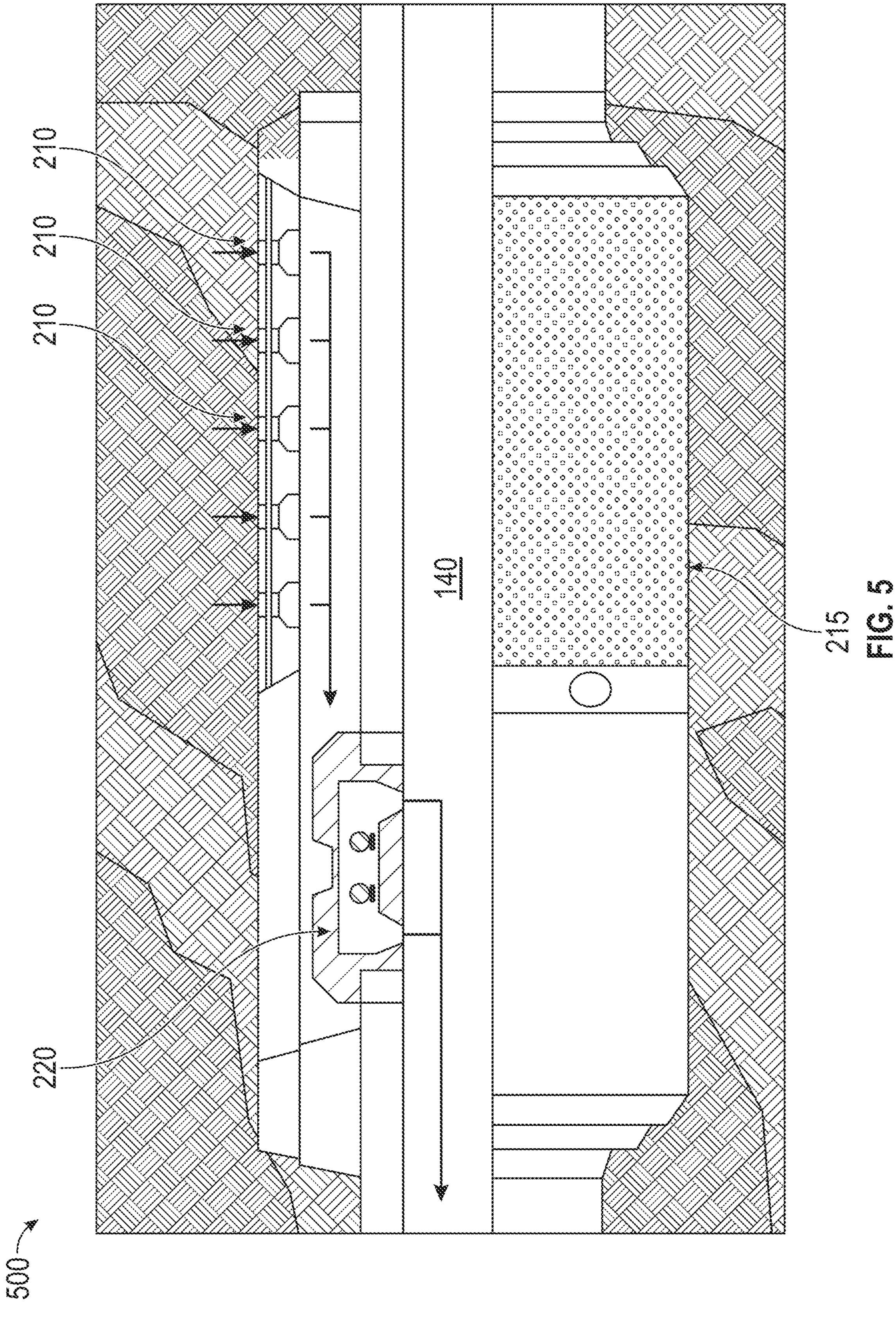
FIG. 5 shows a device in accordance with one or more embodiments.

FIG. 5 shows a cross-sectional view of a D-AICD in accordance with on or more embodiments. Specifically, FIG. 5 shows the D-AICD (200) of FIG. 2 without some of the components when the GICV (220) solely functions based on the chemical reactions. For example, FIG. 5 illustrates a G-AICD (500) including the GICV (220), tubing string (140), ports (210), and sand screen (215). In such instances, the GICV (220) may function without the use of the turbine generator, voltage regulator, battery, control system, and dielectric sensor described in FIG. 2.

FIGS. 6-9 show close-up views of components of FIG. 2 for operating the GICV in an active operating mode rather than or in combination with a passive operating mode based on chemical reactions as discussed in FIGS. 4-5.

Figure 6:
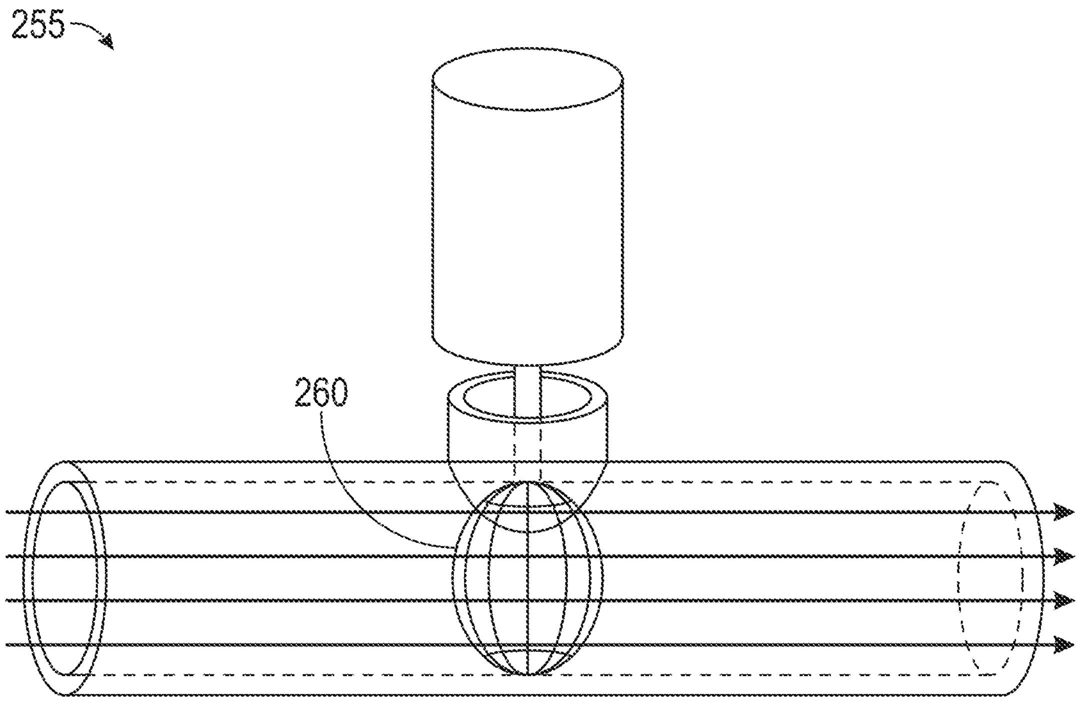
FIG. 6 shows a turbine generator used in conjunction with FIG. 2 in accordance with one or more embodiments.

FIG. 6 shows a turbine generator in accordance with one or more embodiments. Specifically, FIG. 6 shows a close-up view of the turbine generator (255) in FIG. 2. The turbine generator (255) may be a 12 volts direct current (VDC) bidirectional downhole turbine generator. As discussed in FIG. 2, the turbine generator (255) may include a blade spinner (260). The blade spinner (260) may be a multi-blade spinner submerged in the flowing downhole fluid in the chamber (205). The blade spinner (260) may provide rotational force for powering electrical motors mounted on a central axis of the turbine generator (255).

Figure 7:
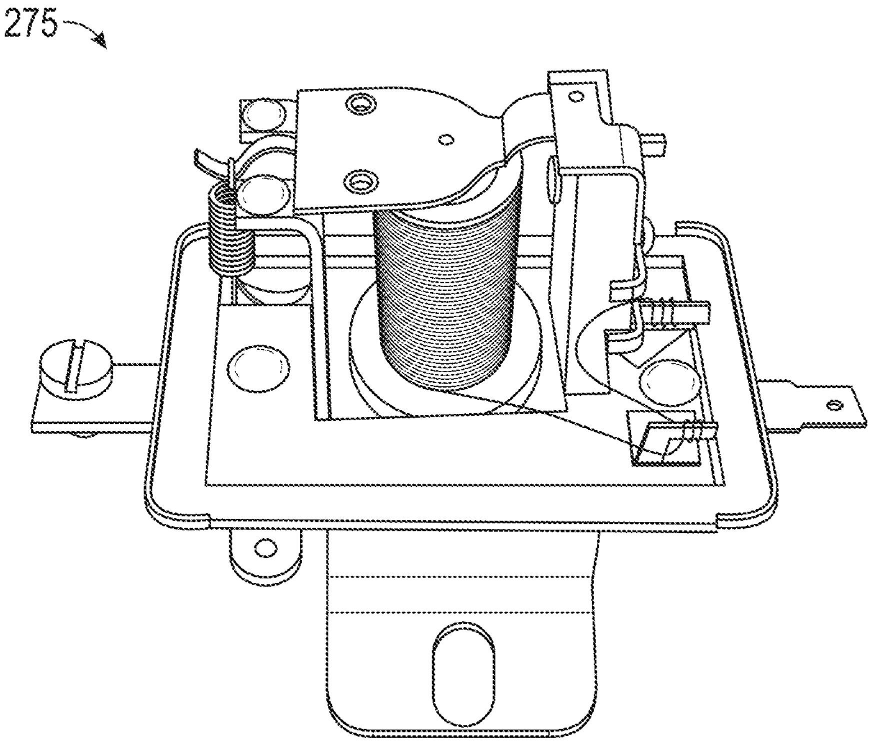
FIG. 7 shows a voltage regulator used in conjunction with FIG. 2 in accordance with one or more embodiments.

FIG. 7 shows a voltage regulator in accordance with one or more embodiments. Specifically, FIG. 7 shows a close-up view of the turbine generator (255) described in FIG. 2. The voltage regulator (275) may be isolated from the downhole environment housed in the D-AICD (200). The voltage regulator (275) may be an electromechanical 12 VDC regulator used in the automotive industry. The voltage regulator (275) may be modified or adapted to be properly potted and isolated from the downhole environment. The voltage regulator (275) may be devoid of any electronic temperature sensitive electronics. Alternated current from the turbine generator (255) may be redressed and regulated through the voltage regulator (275).

Figure 8:
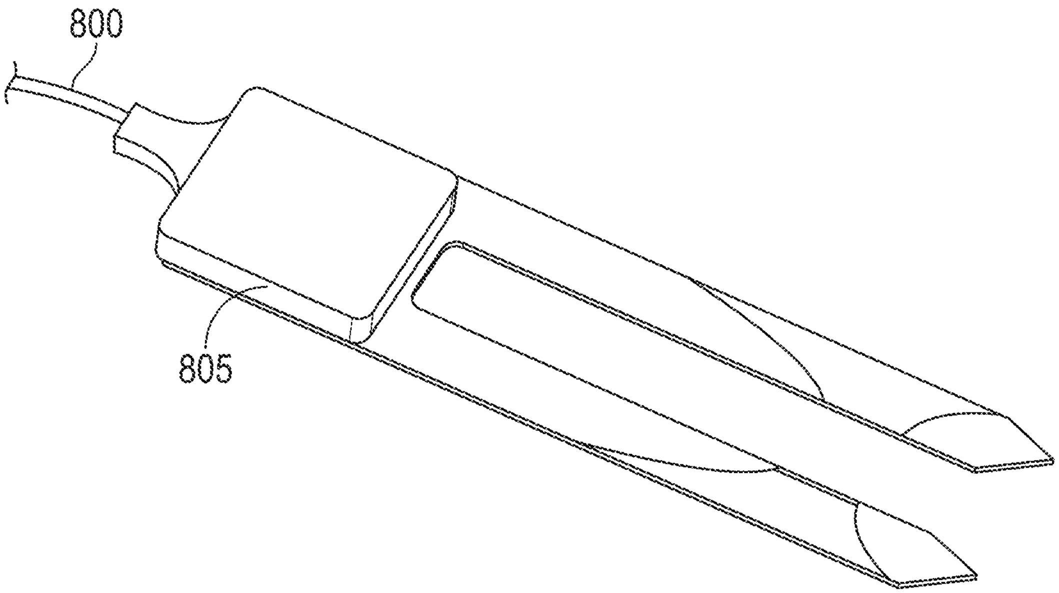
FIG. 8 shows a sensor used in conjunction with FIG. 2 in accordance with one or more embodiments.

FIG. 8 shows a sensor in accordance with one or more embodiments. Specifically, FIG. 8 shows an example dielectric sensor (245) used in conjunction with FIG. 2. As discussed in previous embodiments, water content of produced fluids are evaluated using dielectric sensors (245). For example, the dielectric sensor (800) may be a soil moisture sensitive pronged sensor. The dielectric sensor (800) may include a sensor head (805) with an enclosed circuit board. The dielectric sensors (245) may determine soil water content based on fluid permittivity. As is well known in the industry, dielectric permittivity measures polarization of a material in response to an electromagnetic field. A person of ordinary skill in the art may appreciate that, in hydrocarbon formations, dielectric permittivity of water is an order of magnitude higher than any other rock or fluid component in the subsurface.

Table 1 shows dielectric permittivity (Er) of typical materials found in subsurface formations to illustrate that water permittivity is clearly higher than other components. The dielectric sensors (245) are advantageous over density-based or viscosity-based devices for detecting presence of downhole water, especially for light or low viscosity oil. The dielectric sensors (245) indicate water fraction or saturation water alone different inflow control device compartments.

TABLE 1

| Material Type | Dielectric Permittivity ($\varepsilon_r$) |
|---|---|
| Quartz | 4.4 |
| Sandstone | 4.65 |
| Limestone | 7.5 to 9.2 |
| Dolomite | 6.8 |
| Oil | 2.2 |
| Air, Gas | 1.0 |
| Water | 50 to 78 |

Figure 9:
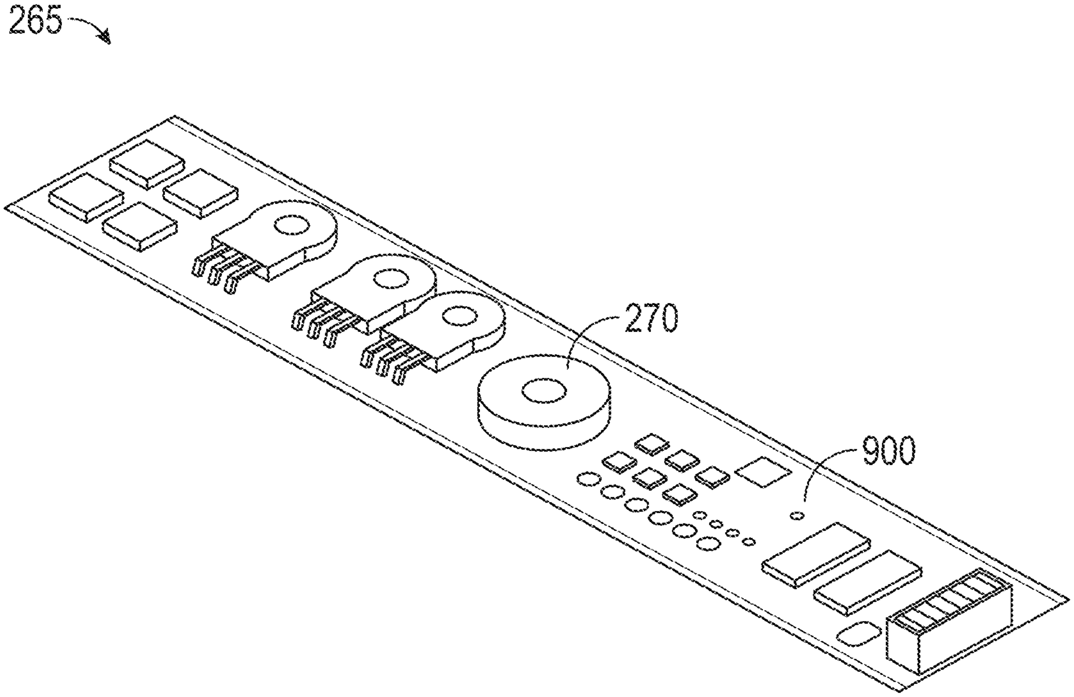
FIG. 9 shows a control system used in conjunction with FIG. 2 in accordance with one or more embodiments.

FIG. 9 shows a control system in accordance with one or more embodiments. Specifically, FIG. 9 shows the control system (265) and controller (270) used in FIG. 2. The control system (265) may include a circuit board (900) used for controlling the voltage of DC current released to activate the galvanic reaction of the GICV (220) and power the dielectric sensor (245).

Figure 10:
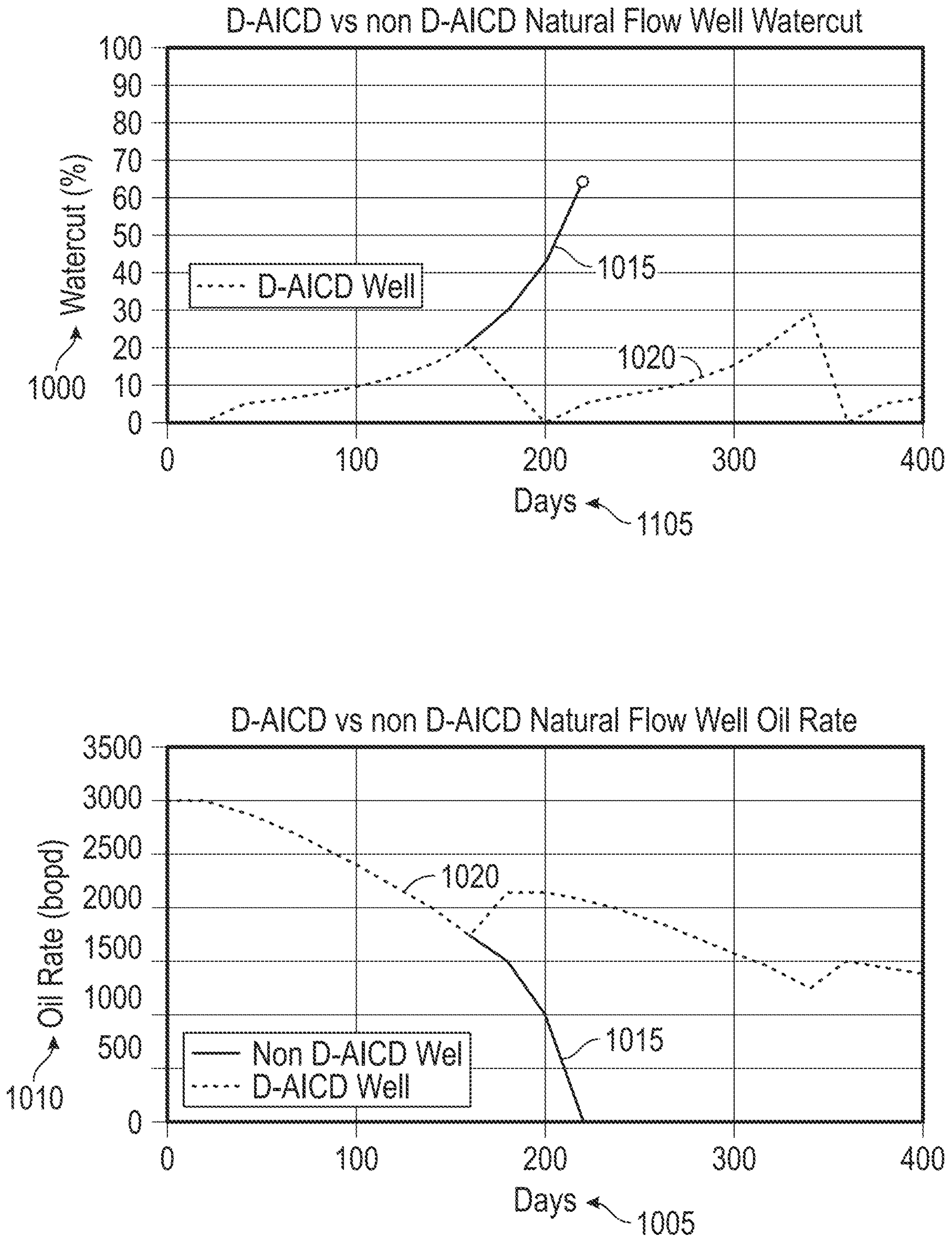
FIG. 10 shows graphs in accordance with one or more embodiments.

FIG. 10 shows graphs in accordance with one or more embodiments. Specifically, FIG. 10 shows two graphs illustrating the benefits of a D-AICD (200) in reducing watercut and extending oil rate production compared to a well without a D-AICD (200). The graphs shows watercut percentage (1000) vs time (1005) measured in days and oil rate (1010) vs time (1005). As shown by the non-D-AICD well line (1015), natural flow ceases at 64% watercut. Whereas, the D-AICD well line (1020) shows a well equipped with at least three D-AICDs with a prolonged oil production at a reduced watercut. Well economics is shown to be improved overall before well intervention is required.

Figure 11:
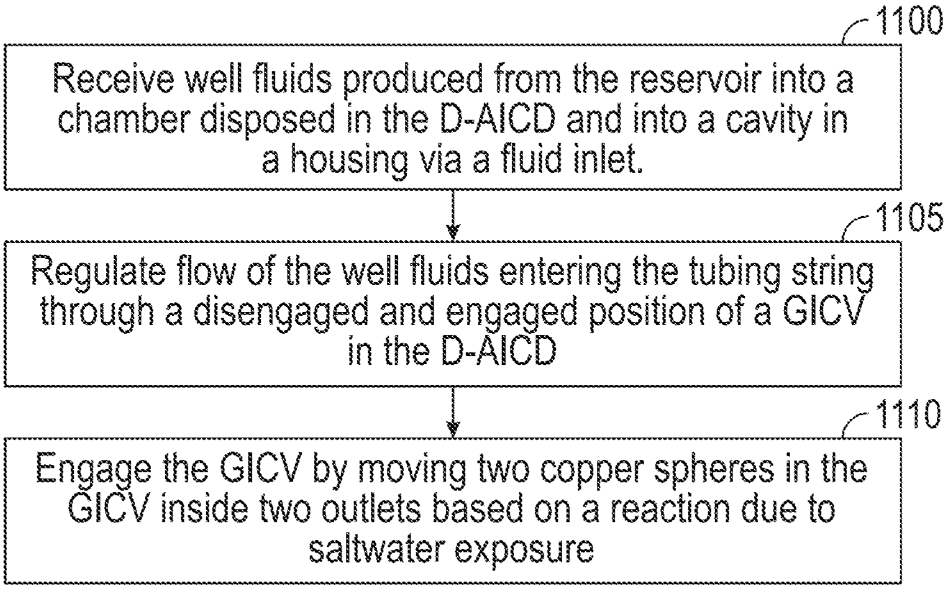
FIG. 11 shows a flowchart in accordance with one or more embodiments.
Figure 12:
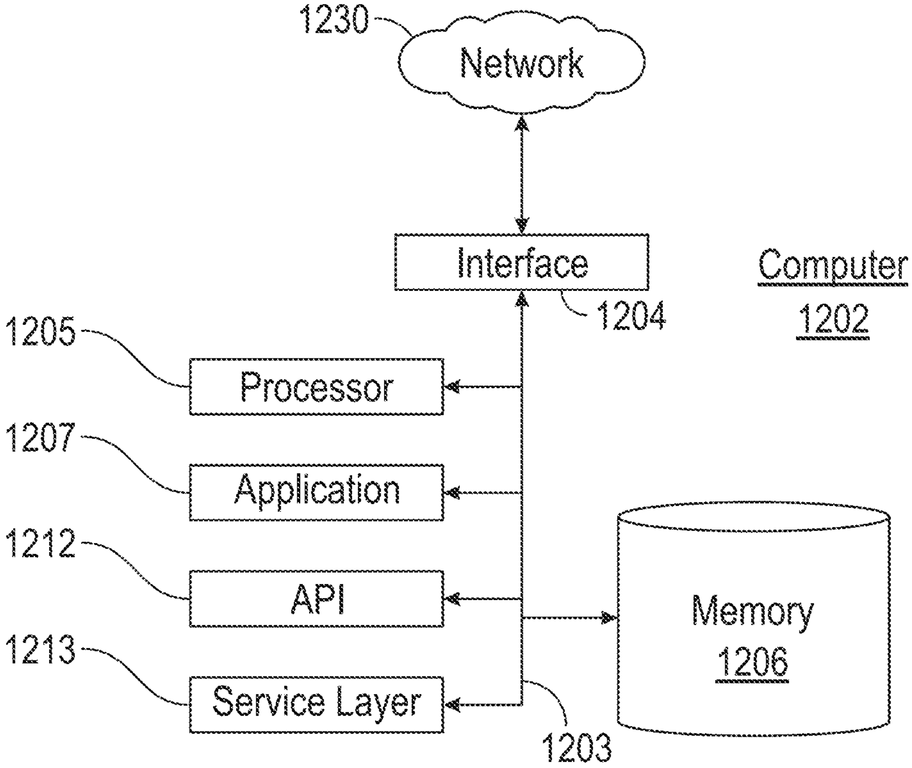
FIG. 12 shows a computer system in accordance with one or more embodiments.

FIG. 11 shows a flowchart in accordance with one or more embodiments. Specifically, FIG. 11 describes a general method for a D-AICD (e.g., D-AICD (200)) disposed in a tubing string within a wellbore in a reservoir. One or more blocks in FIG. 11 may be performed by one or more components (e.g., GICV (220)) as described in FIGS. 1-9 and 12. While various blocks in FIG. 11 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 1100, produced well fluids are received from the reservoir into a chamber disposed in the D-AICD and into a cavity in a housing, via a fluid inlet. The chamber is in fluid communication with the reservoir. Well fluids may be received via ports connecting the chamber with the reservoir. The D-AICD includes a GICV including a housing, a disengaged position, and an engaged position. The GICV regulates fluid flow of the well fluids entering the tubing string using the disengaged and engaged positions. The housing includes the fluid inlet hydraulically connecting the cavity inside the housing to the chamber. The housing further includes at least two outlets hydraulically connecting the cavity to the tubing string. Sand may be filtered from the reservoir via a sand screen located on the D-AICD.

In Block 1105, flow of the well fluids is regulated when entering the tubing string through the disengaged and engaged positions of the GICV. In the disengaged position, the two copper spheres are disposed inside the housing on a seat on a steel based located in a central axis inside the housing. In Block 1110, the GICV is engaged into the engaged position. In the engaged position, the two copper spheres move to sit inside the two outlets. The diameter of the copper spheres is larger than the diameter of the two outlets. The copper spheres may move inside the outlets based on a reaction between the copper spheres, the seat, and the steel base due to saltwater exposure or electrical current voltage generation. The seat includes a spot tin solder welding.

In some embodiments, water content and water arrival in the chamber are measured using a dielectric sensor coupled to the GICV. The dielectric sensor may include a permittivity-based water sensor. The voltage may be generated to adjust the GICV into the engaged and disengaged positions via a turbine generator. The turbine generator may include a blade spinner and/or rotor disposed in the chamber. The water content and arrival data may be received by a control system in the D-AICD. The voltage may be automatically adjusted using a controller coupled to the control system and voltage regulator based on the received water content and arrival. The control system and dielectric sensor may be powered using the turbine generator. The turbine generator, control system, and voltage regulator may be powered by a battery coupled to the voltage regulator. The battery may be made up of a sodium nickel chloride material or a sodium sulfur material. The voltage regulator may be isolated from the downhole environment. The voltage regulator may be an electromechanical 12 VDC. The turbine generator may include a 12 VDC bidirectional generator.

Embodiments may be implemented on a computer system. FIG. 5 is a block diagram of a computer system (1202) used to provide computational functionalities associated with described algorithms, methods, functions, processes, flows, and procedures as described in the instant disclosure, according to an implementation. The illustrated computer (1202) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1202) may include a computer that includes an input device, such as a keypad, keyboard, touch screen, or other device that can accept user information, and an output device that conveys information associated with the operation of the computer (1202), including digital data, visual, or audio information (or a combination of information), or a GUI.

The computer (1202) can serve in a role as a client, network component, a server, a database or other persistency, or any other component (or a combination of roles) of a computer system for performing the subject matter described in the instant disclosure. The illustrated computer (1202) is communicably coupled with a network (1230). In some implementations, one or more components of the computer (1202) may be configured to operate within environments, including cloud-computing-based, local, global, or other environment (or a combination of environments).

At a high level, the computer (1202) is an electronic computing device operable to receive, transmit, process, store, or manage data and information associated with the described subject matter. According to some implementations, the computer (1202) may also include or be communicably coupled with an application server, e-mail server, web server, caching server, streaming data server, business intelligence (BI) server, or other server (or a combination of servers).

The computer (1202) can receive requests over network (1230) from a client application (for example, executing on another computer (1202)) and responding to the received requests by processing the said requests in an appropriate software application. In addition, requests may also be sent to the computer (1202) from internal users (for example, from a command console or by other appropriate access method), external or third-parties, other automated applications, as well as any other appropriate entities, individuals, systems, or computers.

Each of the components of the computer (1202) can communicate using a system bus (1203). In some implementations, any or all of the components of the computer (1202), both hardware or software (or a combination of hardware and software), may interface with each other or the interface (1204) (or a combination of both) over the system bus (1203) using an application programming interface (API) (1212) or a service layer (1213) (or a combination of the API (1212) and service layer (1213). The API (1212) may include specifications for routines, data structures, and object classes. The API (1212) may be either computer-language independent or dependent and refer to a complete interface, a single function, or even a set of APIs. The service layer (1213) provides software services to the computer (1202) or other components (whether or not illustrated) that are communicably coupled to the computer (1202). The functionality of the computer (1202) may be accessible for all service consumers using this service layer. Software services, such as those provided by the service layer (1213), provide reusable, defined business functionalities through a defined interface. For example, the interface may be software written in JAVA, C++, or other suitable language providing data in extensible markup language (XML) format or other suitable format. While illustrated as an integrated component of the computer (1202), alternative implementations may illustrate the API (1212) or the service layer (1213) as stand-alone components in relation to other components of the computer (1202) or other components (whether or not illustrated) that are communicably coupled to the computer (1202). Moreover, any or all parts of the API (1212) or the service layer (1213) may be implemented as child or sub-modules of another software module, enterprise application, or hardware module without departing from the scope of this disclosure.

The computer (1202) includes an interface (1204). Although illustrated as a single interface (1204) in FIG. 5, two or more interfaces (1204) may be used according to particular needs, desires, or particular implementations of the computer (1202). The interface (1204) is used by the computer (1202) for communicating with other systems in a distributed environment that are connected to the network (1230). Generally, the interface (includes logic encoded in software or hardware (or a combination of software and hardware) and operable to communicate with the network (1230). More specifically, the interface (1204) may include software supporting one or more communication protocols associated with communications such that the network (1230) or interface's hardware is operable to communicate physical signals within and outside of the illustrated computer (1202).

The computer (1202) includes at least one computer processor (1205). Although illustrated as a single computer processor (1205) in FIG. 5, two or more processors may be used according to particular needs, desires, or particular implementations of the computer (1202). Generally, the computer processor (1205) executes instructions and manipulates data to perform the operations of the computer (1202) and any algorithms, methods, functions, processes, flows, and procedures as described in the instant disclosure.

The computer (1202) also includes a memory (1206) that holds data for the computer (1202) or other components (or a combination of both) that can be connected to the network (1230). For example, memory (1206) can be a database storing data consistent with this disclosure. Although illustrated as a single memory (1206) in FIG. 5, two or more memories may be used according to particular needs, desires, or particular implementations of the computer (1202) and the described functionality. While memory (1206) is illustrated as an integral component of the computer (1202), in alternative implementations, memory (1206) can be external to the computer (1202).

The application (1207) is an algorithmic software engine providing functionality according to particular needs, desires, or particular implementations of the computer (1202), particularly with respect to functionality described in this disclosure. For example, application (1207) can serve as one or more components, modules, applications, etc. Further, although illustrated as a single application (1207), the application (1207) may be implemented as multiple applications (1207) on the computer (1202). In addition, although illustrated as integral to the computer (1202), in alternative implementations, the application (1207) can be external to the computer (1202).

There may be any number of computers (1202) associated with, or external to, a computer system containing computer (1202), each computer (1202) communicating over network (1230). Further, the term "client," "user," and other appropriate terminology may be used interchangeably as appropriate without departing from the scope of this disclosure. Moreover, this disclosure contemplates that many users may use one computer (1202), or that one user may use multiple computers (1202).

In some embodiments, the computer (1202) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A downhole autonomous inflow control device (D-AICD) disposed in a tubing string within a wellbore, the D-AICD comprising:
- a chamber in fluid communication with a reservoir and configured to receive well fluids produced from the reservoir;
- a galvanic inflow control valve (GICV) comprising a housing, a disengaged position, and an engaged position, the GICV configured to regulate flow of well fluids entering the tubing string via the disengaged position and the engaged position, the housing comprising:
  - a fluid inlet hydraulically connecting a cavity disposed inside the housing to the chamber;
  - at least two outlets hydraulically connecting the cavity to the tubing string;
  - in the disengaged position of the GICV, at least two copper spheres are disposed inside the housing, wherein each of the at least two copper spheres is disposed on a distinct seat on a steel base disposed on a central axis inside the housing; and
  - in the engaged position of the GICV, the at least two copper spheres are configured to move inside the at least two outlets based on a reaction between the at least two copper spheres, the distinct seats, and the steel base due to saltwater exposure,
  - wherein the distinct seats comprise spot tin solder bonds, and
  - wherein a diameter of the at least two copper spheres is larger than a diameter of the at least two outlets; and
- a dielectric sensor coupled to the GICV configured to measure a water content and a water arrival within the chamber.

2. The device of claim 1, further comprising:
- a turbine generator comprising a blade spinner disposed in the chamber configured to generate a voltage to adjust the GICV into the engaged position.

3. The device of claim 2, wherein the turbine generator comprises a 12 volts direct current (VDC) bidirectional generator.

4. The device of claim 2, further comprising:
- a control system in communication with a dielectric sensor and the turbine generator configured to receive a measured water content and water arrival, via the dielectric sensor, and create commands to adjust the voltage, via a voltage regulator, wherein the control system comprises a circuit board.

5. The device of claim 4,
- wherein the turbine generator is configured to power the control system and the dielectric sensor.

6. The device of claim 4, further comprising:
- a battery coupled to the voltage regulator to power the control system, the turbine generator, and the voltage regulator,
- wherein the battery comprises a sodium nickel chloride material or a sodium sulfur material.

7. The device of claim 4, wherein the voltage regulator is isolated from a downhole environment and is an electromechanical 12 volts direct current (VDC).

8. The device of claim 1, further comprising:
- a plurality of ports fluidly connecting the chamber with the reservoir; and
- a sand screen configured to filter sand from the reservoir.

9. The device of claim 1, wherein the dielectric sensor comprises a permittivity-based water content sensor.

10. A method for a downhole autonomous inflow control device (D-AICD) disposed in a tubing string within a wellbore, the D-AICD comprising:
- a chamber in fluid communication with a reservoir;
- a galvanic inflow control valve (GICV) comprising a housing, a disengaged position, and an engaged position, the GICV configured to regulate a flow of well fluids entering the tubing string via the disengaged position and the engaged position, the housing comprising:
  - a fluid inlet hydraulically connecting a cavity disposed inside the housing to the chamber;
  - at least two outlets hydraulically connecting the cavity to the tubing string;
  - in the disengaged position of the GICV, at least two copper spheres are disposed inside the housing, wherein each of the at least two copper spheres is disposed on a distinct seat on a steel base disposed on a central axis inside the housing; and
  - in the engaged position of the GICV, the at least two copper spheres are configured to move inside the at least two outlets based on a reaction between the at least two copper spheres, the distinct seats, and the steel base due to saltwater exposure,
  - wherein the distinct seats comprise spot tin solder bonds, and
  - wherein a diameter of the at least two copper spheres is larger than a diameter of the at least two outlets,
- the method comprising:
  - receiving well fluids produced from the reservoir into the chamber disposed in the D-AICD and into the cavity in the housing via the fluid inlet;
  - measuring a water content and a water arrival within the chamber via a dielectric sensor coupled to the GICV; and
  - regulating flow of the received well fluids entering the tubing string, via the at least two outlets in the housing, through the disengaged position and the engaged position of the GICV
  - engaging the GICV into the engaged position by moving the at least two copper spheres to sit inside the at least two outlets based on the reaction between the at least two copper spheres, the seat, and the steel base due to saltwater exposure.

11. The method of claim 10, further comprising:
- generating a voltage to adjust the GICV into the engaged position via a turbine generator comprising a blade spinner disposed in the chamber.

12. The method of claim 11, wherein the turbine generator comprises a 12 volts direct current (VDC) bidirectional generator.

13. The method of claim 11, further comprising:
- receiving, via a control system, a water content and a water arrival measured by a dielectric sensor;
- automatically adjusting, via a controller coupled to the control system, the voltage using a voltage regulator, based on the received water content and the received water arrival.

14. The method of claim 13, further comprising:
powering the control system and the dielectric sensor via the turbine generator.

15. The method of claim 13, further comprising:
powering the control system, the turbine generator, and the voltage regulator, via a battery coupled to the voltage regulator,
wherein the battery comprises a sodium nickel chloride material or a sodium sulfur material.

16. The method of claim 13, wherein the voltage regulator is isolated from a downhole environment and is an electromechanical 12 volts direct current (VDC).

17. The method of claim 10, wherein receiving well fluids comprises receiving well fluids via a plurality of ports connecting the chamber with the reservoir and filtering sand from the reservoir via a sand screen.

18. The method of claim 10, wherein the dielectric sensor comprises a permittivity-based water content sensor.

* * * * *